UNITED STATES PATENT OFFICE.

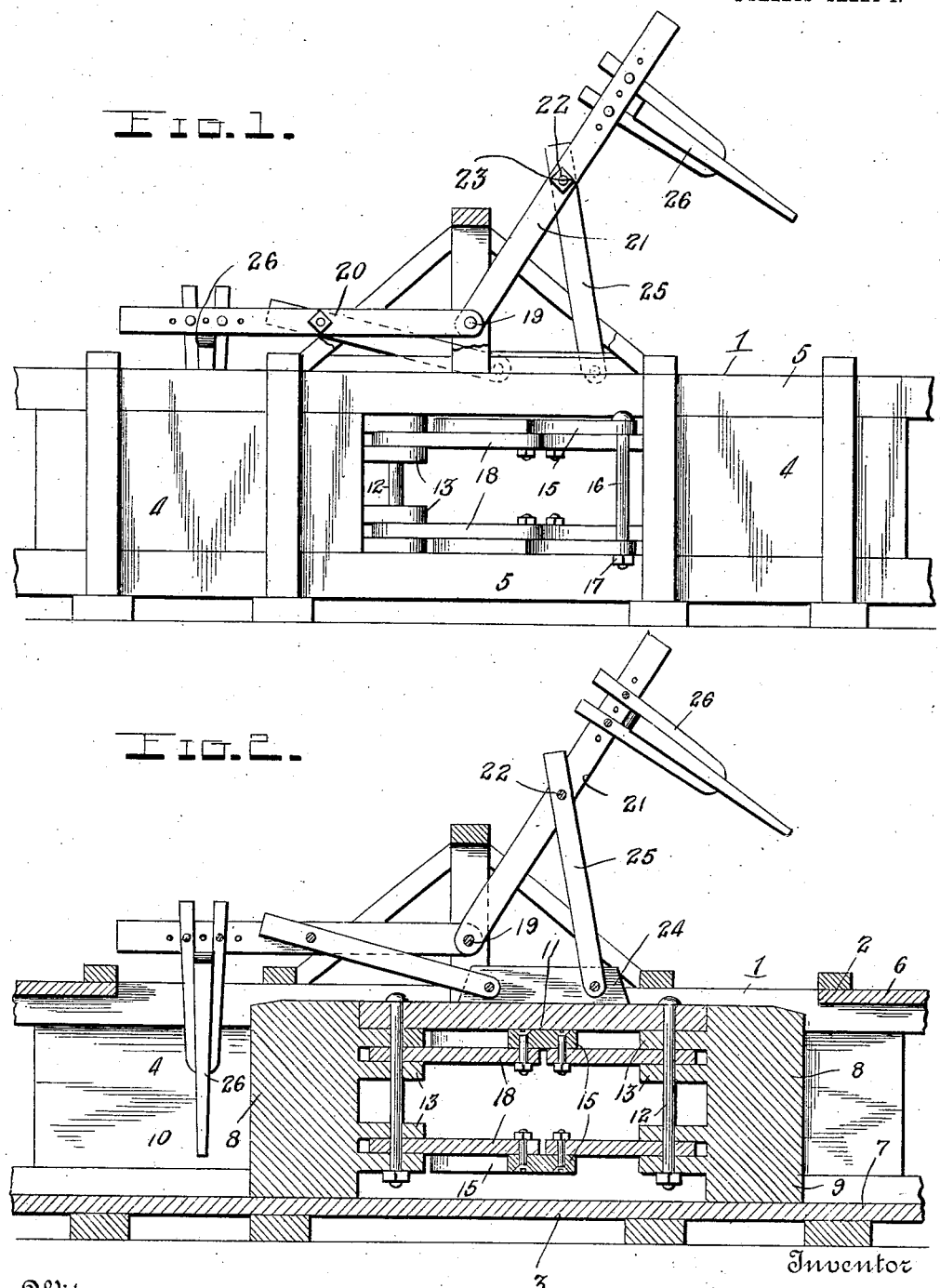

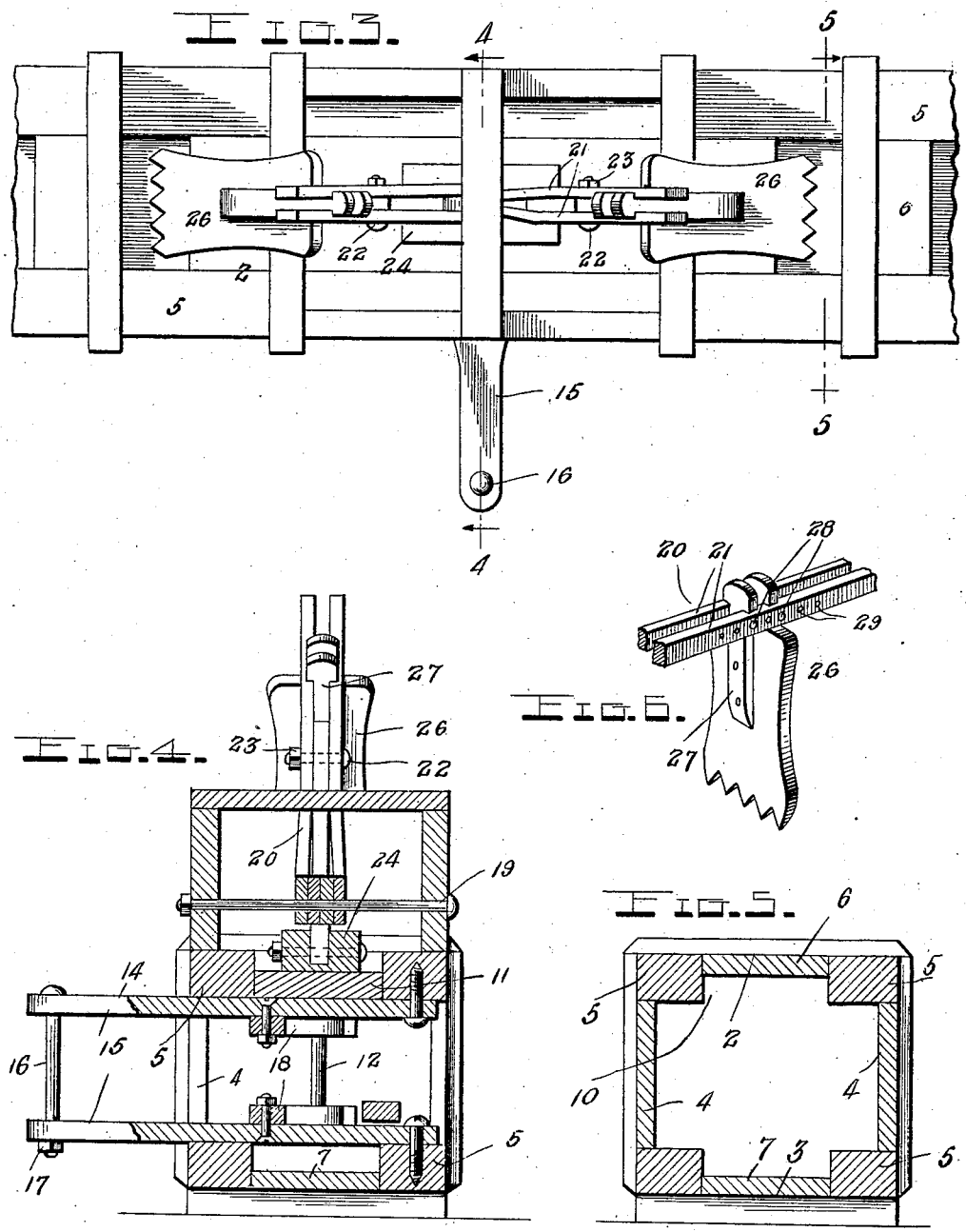

GEORGE W. SHEPARD, OF TECUMSEH, OKLAHOMA.

BALING-PRESS.

No. 884,530.

Specification of Letters Patent.

Patented April 14, 1908.

Application filed October 14, 1907. Serial No. 397,393.

*To all whom it may concern:*

Be it known that I, GEORGE W. SHEPARD, a citizen of the United States, residing at Tecumseh, in the county of Pottawatomie and State of Oklahoma, have invented certain new and useful Improvements in a Baling-Press; and I do declare the following to be a full, clear, and exact description of the invention, such as will enable others skilled in the art to which it appertains to make and use the same.

This invention has relation to new and useful improvements in baling presses.

The principal object of the invention is to provide automatic double feed action so that the press may accomplish twice the quantity of work that may be accomplished through the employment of other devices of this character.

A further object of the invention is to provide a simple and efficiently operating actuating means for the plungers and feed mechanism.

In the accompanying drawings,—Figure 1 is a side elevation of a baling press constructed in accordance with the invention, partly in section; Fig. 2 is a central longitudinal vertical sectional view; Fig. 3 is a top plan view, the operating lever in its intermediate position; Fig. 4 is a cross section on the line 4—4 of Fig. 3; Fig. 5 is a cross section taken on the line 5—5 of Fig. 3; Fig. 6 is a detail perspective view of the outer end of one of the feed levers and feed forks.

Referring more particularly to the drawings, which are for illustrative purposes only, and therefore are not drawn to any particular scale, 1 indicates the frame of the press, said frame comprising a top and bottom, 2 and 3 respectively, and sides 4. The top and bottom of the frame are formed by longitudinal side members 5 having fastened to their outer edges top and bottom boards or members 6 and 7, respectively. The top member is provided with an opening between the baling chambers.

8 indicates the plungers, which are provided at their top and bottoms with guide members 9 arranged to work in the guideways 10 of the frame, formed by the construction of the top and bottom. Said plungers are connected together by a flat connecting member 11 adapted to work between the side members of the top and connected at its ends with the plungers by vertically disposed fastening bolts 12, extending through the ends of said connecting strip and through corresponding vertically spaced lugs or extensions 13, extending inwardly from the inner ends of the plungers.

A laterally disposed operating lever 14, is formed by two vertically spaced lever members 15, the uppermost member being pivoted at its inner end to one of the side members of the top at a point centrally of the distance between the feed chambers, and the lowermost lever member pivoted to one of the side members of the bottom at a point in vertical alinement with the pivot point of the uppermost member. Said lever members are connected at their outer or free ends by a vertically disposed bolt 16, having a nut 17 at its lower end, and said lever is connected with the plungers by a plurality of longitudinally disposed connecting members 18 connected at their inner ends with the lever members and positioned between the lugs or extensions of the plungers at their opposite ends by the fastening bolts 12.

A laterally disposed pivot rod or member 19 is rigidly sustained above the top of the frame immediately above the pivot points of the lever members, and pivoted to said pivot rod at their extreme inner or lower ends are two oppositely extending feed or operating levers 20, one of which is arranged to work toward and from one of the feed chambers, and the other toward and from the other feed chamber. Each of the feed or operating levers comprises two oppositely disposed spaced bars or members 21, connected by a bolt and nut 22 and 23, respectively.

Two spaced longitudinal centrally disposed extensions or members 24 arise from the upper face or top of the connecting member 11, and pivoted at their extreme inner or lower ends by bolts and nuts, or other equivalent means, at points equidistant to one side of the pivot points of the operating levers, when in the position assumed when the operating lever 14 is in its central position, are two connecting members 25, the upper or outer ends of which extend between the bars or members of the feed levers and are connected to the same by the bolts 22.

A feed fork 26 is adjustably secured to the free end of each of the feed levers by two fastening members 27, arranged on opposite faces to the feed fork, and having transverse apertures in their inner ends to receive fastening bolts 28, adapted to extend through either two of alining series of apertures 29 in the free ends of the lever members.

From the construction illustrated and defined, it will be perceived that while one of the feed levers is moving upward or away from its feed chamber, and the adjacent plunger is moving toward and into the said feed chamber, the other member will remain stationary until the first mentioned lever has nearly reached the end of its forward stroke, when it will be moved slightly by the adjacent connecting member and thrown off "dead center", when said lever will be caused to move downward with accelerated speed.

Said operating lever 14 may be actuated by any suitable power.

Having described my invention, I claim:—

1. In a baling press of the character specified, a frame, plungers movable in the frame, a transverse pivot bar sustained above the frame, two oppositely extending feed levers pivotally connected at their inner ends to the pivot bar, feed forks adjustably connected with the outer ends of the feed levers, and connecting means for connecting the feed levers with the plungers whereby the former will be caused to oscillate by movement being imparted to the latter.

2. A baling press of the character specified embracing a frame, plungers movable in the frame, opposite movable feed levers pivotally connected at adjacent points above the frame, feed forks adjustably connected to the outer ends of the feed levers and connecting bars loosely connected at their outer ends to the feed levers at points between the ends thereof and loosely connected at their inner or opposite ends with the plungers.

3. In a press of the character described, the combination of a frame, plungers movable in the frame, a laterally disposed operating lever pivoted to the frame and connected with the plungers, a pivot member sustained immediately above the pivot point of the operating lever, two oppositely movable feed levers pivoted to said pivot member, feed forks adjustably secured to the free ends of the feed levers, and means for connecting the feed levers with the plungers, whereby one of said levers will be thrown off "dead center" and begin its downward stroke before the other lever has completed its upward stroke.

In testimony whereof I have hereunto set my hand in presence of two subscribing witnesses.

GEORGE W. SHEPARD.

Witnesses:
   D. B. MADDEN,
   W. L. McFALL.